United States Patent [19]

Van Duyn et al.

[11] Patent Number: 4,742,435

[45] Date of Patent: May 3, 1988

[54] SUPPORT ARRANGEMENT FOR A VEHICLE HEADLAMP

[75] Inventors: Paul D. Van Duyn, Anderson, Ind.; Keith D. Childress, Sterling Heights, Mich.

[73] Assignee: General Motors Corporation, Detroit, Mich.

[21] Appl. No.: 77,880

[22] Filed: Jul. 27, 1987

[51] Int. Cl.$^4$ .................. G03B 17/00; F21V 3/18; B60Q 1/26
[52] U.S. Cl. ................................ 362/66; 362/289; 362/80; 362/372
[58] Field of Search .................. 362/66, 372, 80, 275, 362/287, 289, 419

[56] References Cited

U.S. PATENT DOCUMENTS

| | | | |
|---|---|---|---|
| 2,410,365 | 2/1944 | Saver | 362/66 |
| 4,188,655 | 2/1980 | Fallon et al. | 362/80 |
| 4,196,459 | 4/1980 | Dick | 362/372 |
| 4,333,131 | 6/1982 | Hujimoto et al. | 362/80 |
| 4,471,413 | 9/1984 | Dick | 362/80 |
| 4,574,334 | 3/1986 | Igura | 362/66 |
| 4,655,567 | 4/1987 | Morley | 362/66 |
| 4,689,725 | 8/1987 | Saijo et al. | 362/289 |

Primary Examiner—Raymond A. Nelli
Attorney, Agent, or Firm—Edward J. Biskup

[57] ABSTRACT

A support arrangement for a vehicle headlamp assembly that includes a stanchion that supports the lamp body through two pivotal connections and facilitates the installation of the lamp body a support panel located at the front end of a motor vehicle.

3 Claims, 3 Drawing Sheets

SUPPORT ARRANGEMENT FOR A VEHICLE HEADLAMP

This invention concerns vehicle headlamps in general and more particularly relates to aim adjustable headlamps normally incorporated in the front end of a vehicle.

More specifically, the present invention concerns a headlamp assembly which includes a stanchion that serves to facilitate attachment of a lamp body of a composite type to the front end of a vehicle and allows selective adjustable movement of the lamp body about a vertical aim axis and a horizontal aim axis. In the preferred form, the headlamp assembly according to the present invention is mountable to a support panel which forms a permanent part of the vehicle and includes upper and lower horizontally oriented walls. A lamp body forms a part of the headlamp assembly and is provided with a reflector member having a pair of side by side cavities for projecting a low beam of light and a high beam of light forwardly of the vehicle. The stanchion is connected to the lamp body between the pair of cavities and includes a body portion formed with upper and lower mounting brackets which are fastened to the upper and lower walls of the support panel, respectively. A ball stud member is rigidly connected to the body portion adjacent the upper mounting bracket for pivotally supporting an upper portion of the lamp body. In addition, an adjustment mechanism has a gear housing which is connected to the body portion adjacent the lower mounting bracket and includes a pair of rotatable shafts interconnected within the gear housing. One of the shafts is vertically orientated and extends along the body portion terminating with a head located to the rear of the ball stud member. The other shaft is horizontally orientated and is threaded along its entire length and terminates at one end with a ball member pivotally connected to the lower portion of the lamp body. The two shafts are drivingly interconnected within the gear housing so that upon rotation of the vertical shaft, the threaded shaft moves axially relative to the stanchion causing the lamp body to be adjusted in position about the horizontal aim axis passing through the ball stud.

The objects of the present invention are to provide a new and improved mounting arrangement for a vehicle headlamp that includes a stanchion that supports the lamp body through two pivotal connections and facilitates the installation of the headlamp to a support panel at the front end of a motor vehicle; to provide a new and improved headlamp assembly which is manufactured in the form of a subassembly and includes a stanchion that is readily attached to a support panel and allows the lamp body to be selectively adjusted about a horizontal aim axis and a vertical aim axis; and to provide a new and improved headlamp assembly which includes a stanchion and a pair of adjustment mechanisms which allow the headlamp assembly to be mounted between a pair of vertically spaced horizontally orientated walls and allows adjustable positioning of the lamp body about a horizontal aim axis and a vertical aim axis.

Other objects, features and advantages of the present invention will be apparent from the following description when taken with the drawings in which FIG. 1 is a frontal elevational view of a headlamp assembly according to the present invention mounted to the front support panel of a motor vehicle;

Figure 1:
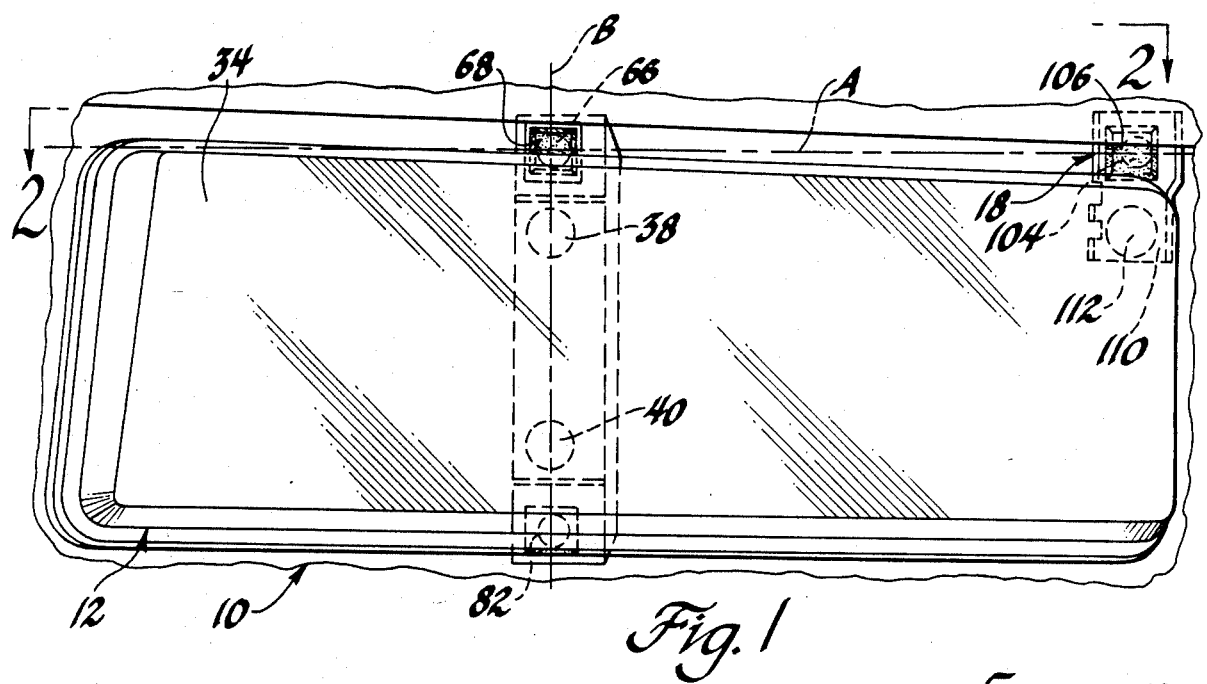
Figure 2:
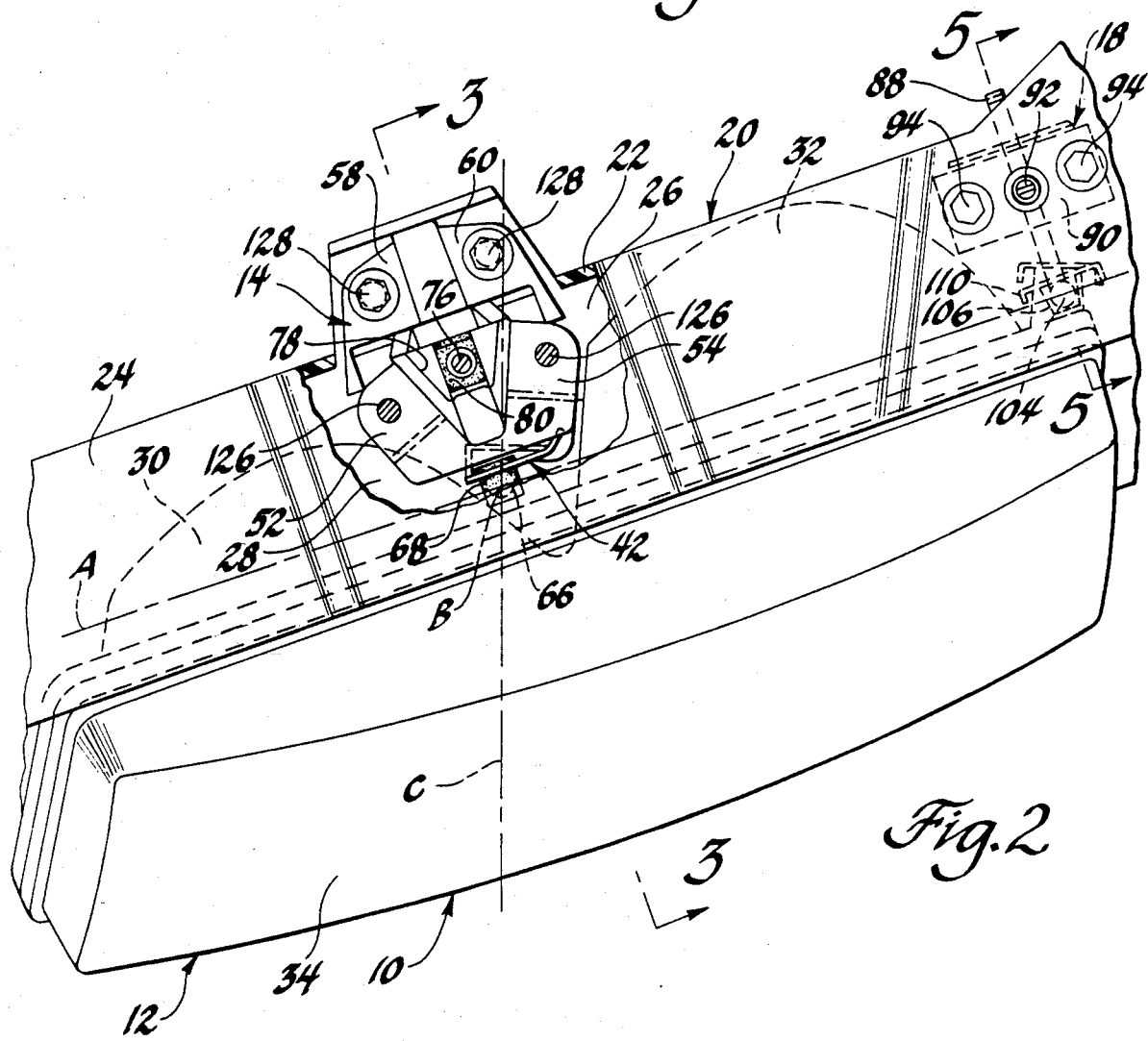
FIG. 2 is a top plan view taken on line 2—2 of FIG. 1 with parts broken away to show the top and lower portion of the support stanchion which forms a part of the headlamp assembly.

Referring now to the drawings and more particularly FIGS. 1 and 2 thereof, a headlamp assembly 10 is shown of the replaceable light bulb composite type made according to the present invention. The headlamp assembly includes a lamp body 12, a support stanchion 14 combined with a adjustment mechanism 16 for lamp positioning about a horizontal aim axis A and a adjustment mechanism 18 for lamp positioning about a vertical aim axis B. The headlamp assembly 10 is normally shipped as a unit to a vehicle manufacturer and thereafter is mounted to a support panel 20 at the front end of a motor vehicle so as to permit selective adjustable movement of the lamp body in a horizontal plane containing the horizontal aim axis A and the vertical plane containing a vertical aim axis B.

The support panel 20, in this case, is made of a plastic material and is fastened to the sheet metal structure (not shown) at the front portion of the motor vehicle. The support panel 20 includes a back wall 22 integral with a pair of vertically spaced generally horizontal top and bottom walls 24 and 26 to which are fastened the stanchion 14 and the adjustment mechanisms 16 and 18 which mounts the headlamp assembly 10 to the support panel 20 and also serves to reposition the lamp body 12 about the aforementioned vertical aim axis B and the horizontal aim axis A.

The lamp body 12 includes a plastic reflector member 28 formed with a pair of side by side parabolic cavities 30 and 32, the inner concave surfaces of each of which is aluminized so as to project a light beam forwardly and substantially parallel to an axis C as seen in FIG. 2. It will be noted that, as shown in FIG. 2, the axis C is parallel to the longitudinal center axis of the associated vehicle (not shown) and the headlamp assembly 10 would be the right-hand unit when looking at the front end of the vehicle as seen in FIG. 1. It should be apparent that the angled position of the headlamp unit is due to the rounded streamlined front end design currently popular with motor vehicles. Also, each of the parabolic cavities is provided with a single filament replaceable bulb (not shown) located so as to cause the associated aluminized parabolic concave surface to project a light beam forwardly of the vehicle. The light bulb in the cavity 32 is provided with a filament located so as to allow the associated parabolic surface to project the so-called "low beam" when energized while the light bulb in the cavity 30 projects the so-called "high beam" when the filament thereof is energized. Thus, the lamp body 12 is actually two separate headlamps, a low beam unit and a high beam unit joined together so as to facilitate the aiming adjustment of both lamps.

Figure 3:
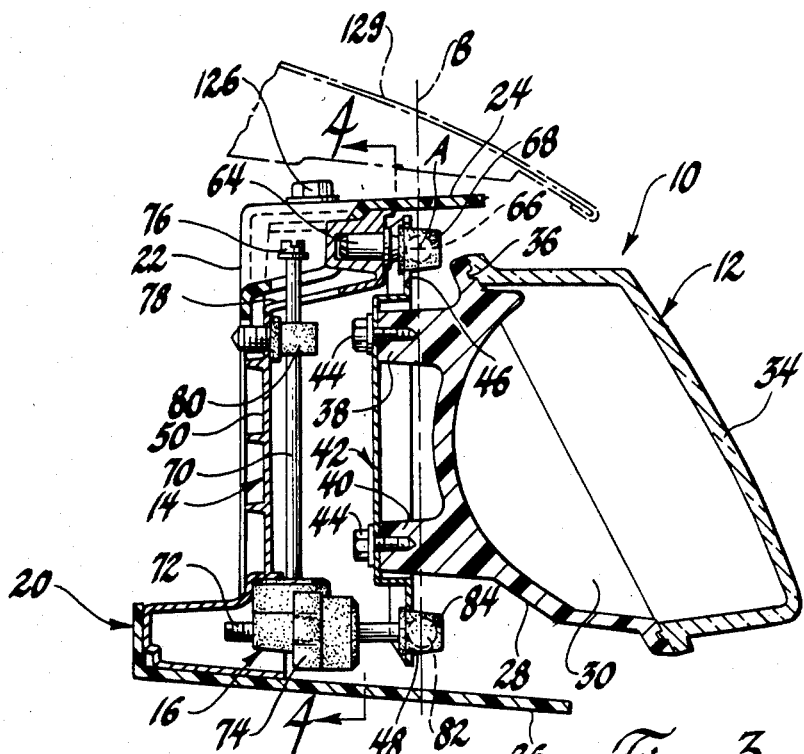
FIG. 3 is a sectional view taken on line 3—3 of FIG. 2 showing the lamp body and the support stanchion.
Figure 4:
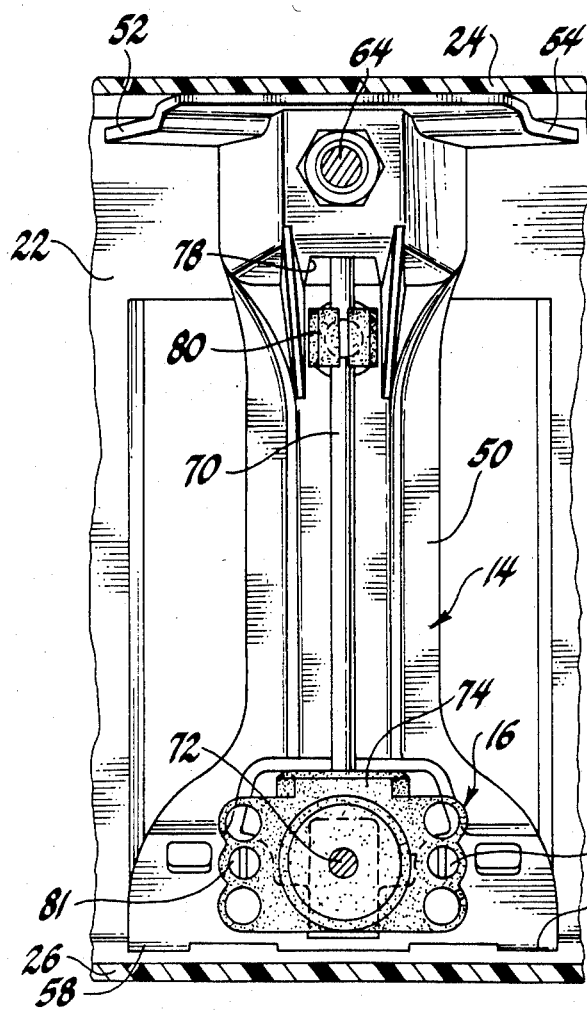
FIG. 4 is an enlarged view of the support stanchion taken on line 4—4 of FIG. 1.
Figure 6:
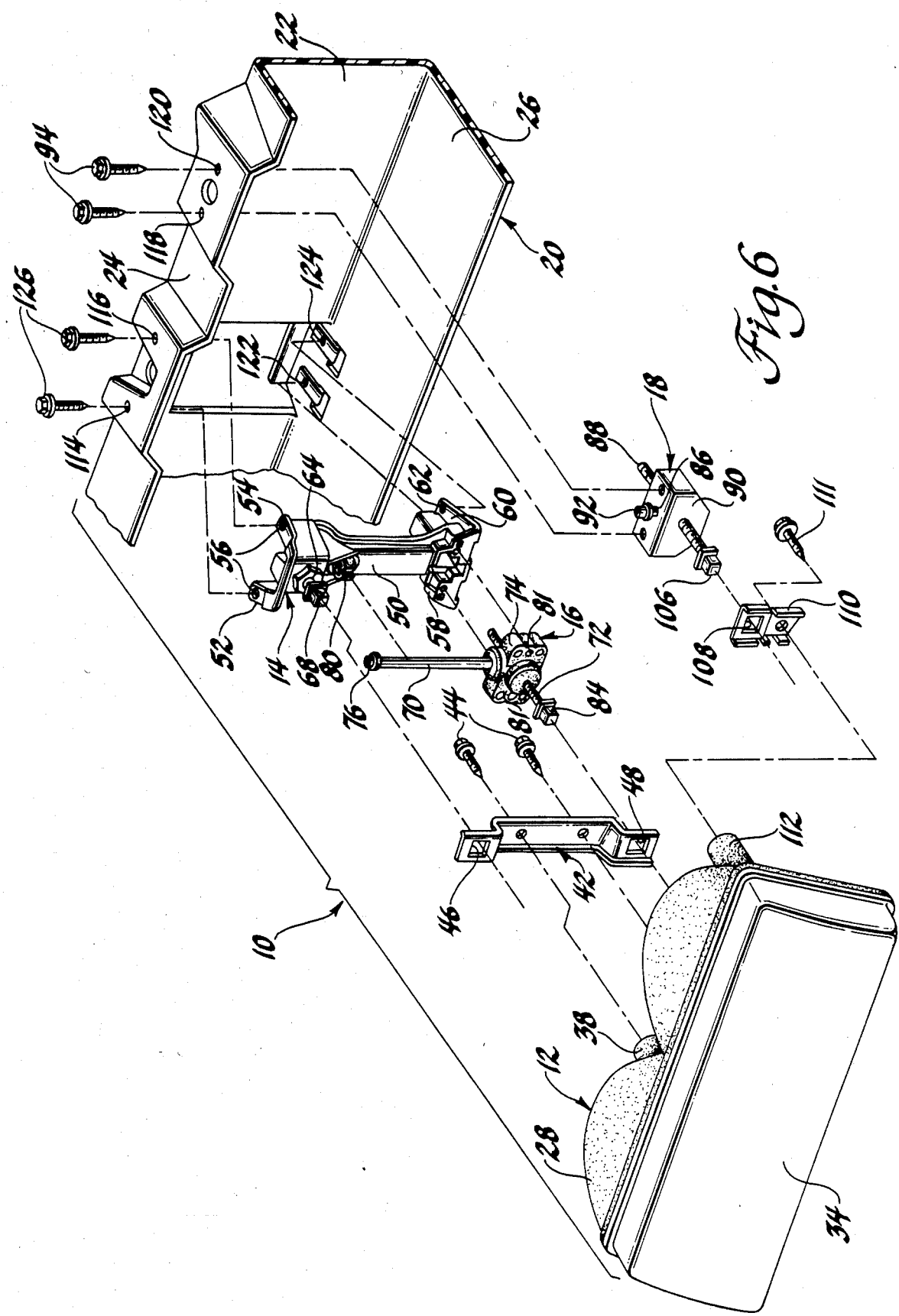
FIG. 6 is an exploded perspective view of the various parts of the headlamp assembly and support panel shown in FIGS. 1 through 5.

The front of the reflector member 28 is closed by a glass or the like material lens 34, the rear marginal portion of which is sealingly received by a channel 36, as seen in FIG. 3, provided around the entire margin of the front portion of the reflector member 28. Centrally located between the cavities 30 and 32 of the reflector member 28 and integrally formed therewith are a pair of vertically spaced bosses 38 and 40 which extend rearwardly and serve to support a bracket 42 fastened thereto by cap screws 44. The upper and lower ends of the bracket 43 have identical square apertures 46 and 48 formed therein as seen in FIG. 6 for purposes which will be explained hereinafter. Also, the bracket 42 is similar to the bracket incorporated with the headlamp assembly shown in FIG. 7 of copending application Ser. No. 039,924 filed on Apr. 20, 1987 in the name of Paul D. Van Duyn et al and assigned to the assignee of this invention.

As best seen in FIGS. 2, 3, 4 and 6 the stanchion 14 includes an upstanding body portion 50, the upper end of which is formed with a pair of laterally outwardly extending arms 52 and 54, each having a circular opening 56 formed therein. Similarly, the lower end of the body portion 50 is formed with a pair of opposed arms 58 and 60 each having a circular opening 62 formed therein. A ball stud member 64 is rigidly secured to the body portion 50 adjacent the upper arms 52 and 54 and has the ball portion 66 thereof received within a plastic socket member 68 which snaps into the aperture 46 in the bracket 42 and is rigidly retained thereby. As mentioned hereinbefore, the adjustment mechanism 16 is incorporated with the stanchion 14 for positioning the lamp body 12 about the horizontal aim axis A. In this regard, the adjustment mechanism 16 includes a pair of orthogonally arranged shafts 70 and 72 which are interconnected by a bevel gear arrangement in a housing 74 that is identical to the gear arrangement incorporated with the adjustment mechanism 18 shown in FIG. 5 so as to provide selective axial movement of the horizontal shaft 72. The vertical shaft 70 has a head 76 which extends through an opening 78 formed in the body portion 50 and, as seen in FIG. 3, is located directly to the rear of the ball stud member 64 and can be easily manipulated from above the headlamp assembly 10 by a hand screwdriver or the like. In addition, the upper portion of the vertical shaft 70 is arranged for rotation within a support clip 80 attached to the body portion 50. The lower end of the vertical shaft 70 extends into the gear housing 74 which is suitably attached as by screws 81 to the body portion 50 forwardly of an adjacent the lower arms 58 and 60. The horizontal shaft 72 extends through the gear housing 74 and has its entire length threaded and the threads thereof engage the internal threads of a drive nut within the housing 74 so that the ball member 82 formed at the end of the shaft 72 is moved longitudinally fore and aft upon rotation of the vertical shaft 70. The ball member 82 is non-rotatably retained within a plastic socket member 84 which is located within the aperture 48 formed in the lower end of the bracket 42. The operation of the adjustment mechanism 16 will be more fully understood from the description of the adjustment mechanism 18 that now follows.

Figure 5:
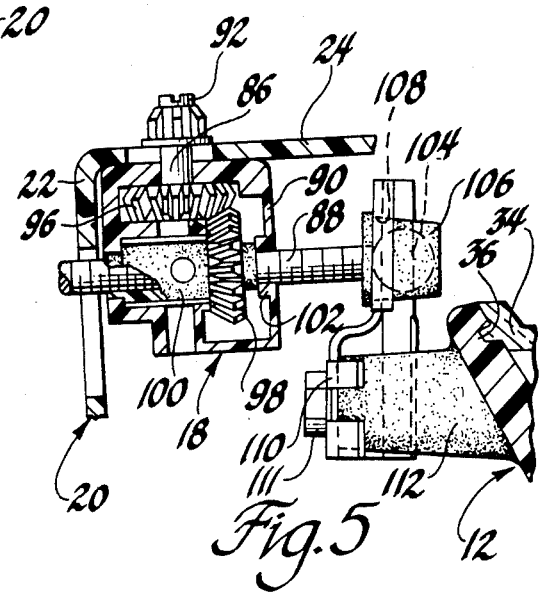
FIG. 5 is an enlarged view taken on line 5—5 of FIG. 2 showing the gearing arrangement within one of the adjustment screw mechanisms.

As best seen in FIGS. 2, 5 and 6, the adjustment mechanism 18 also includes a pair of orthogonally arranged shafts 86 and 88 which are interconnected in a housing 90. The vertical shaft 86 has a head 92 located adjacent the upper wall 24 of the support panel 20 and is also readily manipulated from above the lamp assembly 10 by a hand screwdriver or the like. The lower end of the shaft extends into the gear housing 90 which is fastened to the upper wall 24 by screws 94. In addition, the lower end of the shaft 86 has mounted thereto a bevel gear 96 which meshes with a bevel gear 98 secured to a drive nut 100 one end of which is suitably journaled in a circular recess of the gear housing 90. The other end of the drive nut 100 abuts a shoulder 102 formed in the housing. The shaft 88 has its entire length threaded and the threads thereof engage the internal threads of the drive nut 100 so that upon rotation of the latter, the shaft 88 is moved longitudinally, forwardly or rearwardly depending upon the direction of rotation of the vertical shaft 86. As in the case of the horizontal shaft 72 of the adjustment mechanism 16, the forward end of the horizontal shaft 88 is formed with a ball member 104 which is non-rotatably received within a plastic socket member 106 snapped into and maintained within a square aperture 108 formed in a bracket 110. It will be understood that the socket member 106 will allow pivotal movement of the ball member 104 relative thereto, but will prevent rotation of the ball member 104 about the longitudinal center axis of the shaft 88. The bracket 110 is secured by screw 111 to a boss 112 integrally formed with the reflector member 28 adjacent the upper right hand corner thereof as seen in FIG. 1. Thus, from the above description, it should be apparent that a selected rotation by a screwdriver or the like applied to the head 92 of the shaft 86 will cause a rotation of the bevel gears 96 and 98 and rotation of the drive nut 100 within its gear housing 90. This results in axial movement of the shaft 88 along its longitudinal axis.

As alluded to hereinbefore, when the headlamp assembly 10 is shipped to the vehicle assembly plant, the brackets 42 and 110, stanchion 14 and associated adjustment mechanism 16, as well as the adjustment mechanism 18 can be preassembled and connected to the lamp body 12 as described above or can be shipped as individual parts and assembled at the plant. Afterwards, the combined headlamp assembly 10 can be installed into the support panel 20 of the vehicle which has appropriately located mounting holes 114–120 and support clips 122 and 124 provided therein as seen in FIG. 6 so as to permit the connections between the stanchion 14 and the adjustment mechanism 18. Thus, the cap screws 126 are threaded through the openings 56 in the arms 52 and 54 of the stanchion to wall 24, and as seen in FIG. 2, the cap screws 128 fasten the arms 58 and 60 to the bottom wall 26 through the clips 122 and 124. The screws 94 then pass through the holes 118 and 120 of the top wall 24 and into the accommodating holes formed in the housing 90 for fastening the adjustment mechanism 18 to the support panel 20. Once installed, the stanchion 14 not only serves to support the lamp body 12 but, in addition, serves as a reinforcing member for interconnecting the upper and lower walls 24 and 26 of the support panel 20. Therefore, in a sense the stanchion 14 serves to rigidify and increase the longitudinal bending strength of the walls 24 and 26 of the support panel 20.

After the head lamp assembly 10 is installed into the support panel 20, the centers of the ball members 66 and 104 will be located on the horizontal aim axis A and the centers of the ball members 66 and 82 will be located along the vertical aim axis B as seen in FIG. 1. Therefore, when it is required to adjust the position of the lamp body 12 about the horizontal aim axis A, the head 76 on the vertical shaft 70 of the adjustment mechanism 16 will be rotated in the proper direction to cause the desired movement of the lamp body 12 about the horizontal aim axis A defined by the ball members 66 and 104. Similarly, if it is required to adjust the position of the lamp body 12 about the vertical aim axis B, the head on the vertical shaft 86 of the adjustment mechanism 18 is rotated in the proper direction resulting in a desired movement of the lamp body 12 about the ball members 66 and 82. One advantage of having the horizontal aim axis A located in the position shown in FIG. 1 is that repositioning of the lamp body 12 about the axis A does not alter to any significant extent the relationship between the upper portion of lens 34 and the frontal edge of the vehicle hood 129 as seen in FIG. 3.

Various changes and modifications can be made in the construction without departing from the spirit of the invention. Since such changes and modifications are contemplated by the inventors, they do no wish to be limited except by the scope of the appended claims.

The embodiments of the invention in which an exclusive property or privilege is claimed are defined as follows:

1. The combination with a headlamp assembly adapted to be mounted to a support panel at the front end of a motor vehicle so as to allow selective adjustable movement of a lamp body about a vertical aim axis and a horizontal aim axis, said support panel including vertically spaced upper and lower substantially horizontal walls, said headlamp assembly including a stanchion connecting said lamp body to said upper and lower walls and allowing said lamp body to be adjusted about said vertical aim axis and said horizontal aim axis, said stanchion including an upstanding body formed with upper and lower mounting arms fastened to said upper and lower walls respectively, a ball stud member rigidly connected to said body portion adjacent said upper mounting bracket for supporting an upper portion of said lamp body, an adjustment mechanism having a gear housing connected to said body portion adjacent said lower mounting arms, a vertically orientated rotatable shaft and a horizontally orientated threaded shaft interconnected within said gear housing so as to cause said threaded shaft to be axially moved relative to said gear housing upon rotation of said vertically orientated shaft, and a ball member formed on one end of said threaded shaft and connected to a lower portion of said lamp body so that the lamp body is adjustably movable about the horizontal aim axis upon rotation of said vertical shaft.

2. The combination with a headlamp assembly adapted to be mounted to a support panel at the front end of a motor vehicle so as to allow selective adjustable movement of a lamp body about a vertical aim axis and a horizontal aim axis, said support panel including vertically spaced upper and lower substantially horizontal walls, said lamp body formed with first and second parabolic cavities located side by side for projecting light beams forwardly of the motor vehicle, said headlamp assembly including a stanchion connecting said lamp body to said upper and lower walls and allowing said lamp body to be adjusted about said vertical aim axis and said horizontal aim axis, said stanchion including an upstanding body formed with upper and lower mounting fastened to said upper and lower walls respectively, a ball stud member rigidly connected to said body portion adjacent said upper mounting bracket for supporting an upper portion of said lamp body between said cavities, an adjustment mechanism having a gear housing connected to said body portion adjacent said lower mounting arms, a vertically orientated rotatable shaft and a horizontally orientated threaded shaft interconnected within said gear housing so as to cause said threaded shaft to be axially moved relative to said gear housing upon rotation of said vertically orientated shaft, and a ball member formed on one end of said threaded shaft and connected to a lower portion of said lamp body so that the lamp body between said cavities is adjustably movable about the horizontal aim axis upon rotation of said vertical shaft.

3. The combination with a headlamp assembly adapted to be mounted to a support panel at the front end of a motor vehicle so as to allow selective adjustable movement of a lamp body about a vertical aim axis and a horizontal aim axis, said support panel including vertically spaced upper and lower substantially horizontal walls, said lamp body formed with first and second parabolic cavities located side by side for projecting light beams forwardly of the motor vehicle, said headlamp assembly including a stanchion connecting said lamp body to said upper and lower walls and allowing said lamp body to be adjusted about said vertical axis and said horizontal aim axis, said stanchion including an upstanding body formed with upper and lower mounting arms fastened to said upper and lower walls respectively, a ball stud member rigidly connected to said body portion adjacent said upper mounting bracket for supporting an upper portion of said lamp body between said cavities, an adjustment mechanism having a gear housing connected to said body portion adjacent said lower mounting arms, a vertically orientated rotatable shaft and a horizontally orientated threaded shaft interconnected by bevel gears within said gear housing so as to cause said threaded shaft to be axially moved relative to said gear housing upon rotation of said vertically orientated shaft, said vertically orientated shaft being supported by said body portion for rotation and have a head located to the rear of said ball stud member, and a ball member formed on one end of said threaded shaft and connected to a lower portion of said lamp body between said cavities so that the lamp body is adjustably movable about the horizontal aim axis upon rotation of said vertical shaft.

* * * * *